United States Patent [19]
Maurice

[11] 3,767,017
[45] Oct. 23, 1973

[54] DISC BRAKE WITH PLURAL PISTONS ACTING ON ONE SHOE

[76] Inventor: Jean Maurice, Paris, France

[22] Filed: Feb. 5, 1971

[21] Appl. No.: 112,906

[30] Foreign Application Priority Data
Feb. 13, 1970 France .............................. 7005115

[52] U.S. Cl. ............... 188/72.5, 60/54.6 M, 92/75, 188/345
[51] Int. Cl. ......................................... F16d 55/228
[58] Field of Search ............. 188/72.5, 73.4, 106 P, 188/345; 60/54.5 E, 54.6 E, 54.6 M; 92/75; 192/109 F, 85 AB

[56] References Cited
UNITED STATES PATENTS
3,608,678   9/1971   Kobayashi.......................... 188/73.4
2,951,561   9/1960   Davis............................. 188/73.4 X
3,403,602   10/1968  Brandon, Jr. ...................... 92/75 X
3,554,333   1/1971   Hoenick et al. ................... 188/72.5
3,456,766   7/1969   Beller............................. 188/345

Primary Examiner—George E. A. Halvosa
Attorney—Young & Thompson

[57] ABSTRACT

In a disc brake having a rotary disc with brake shoes on opposite sides, a cylinder block for moving the brake shoes includes at least three pistons all arranged on the same side of the disc and movable perpendicular to the disc, two pistons being movable in one direction and the other piston being movable in the opposite direction.

4 Claims, 5 Drawing Figures

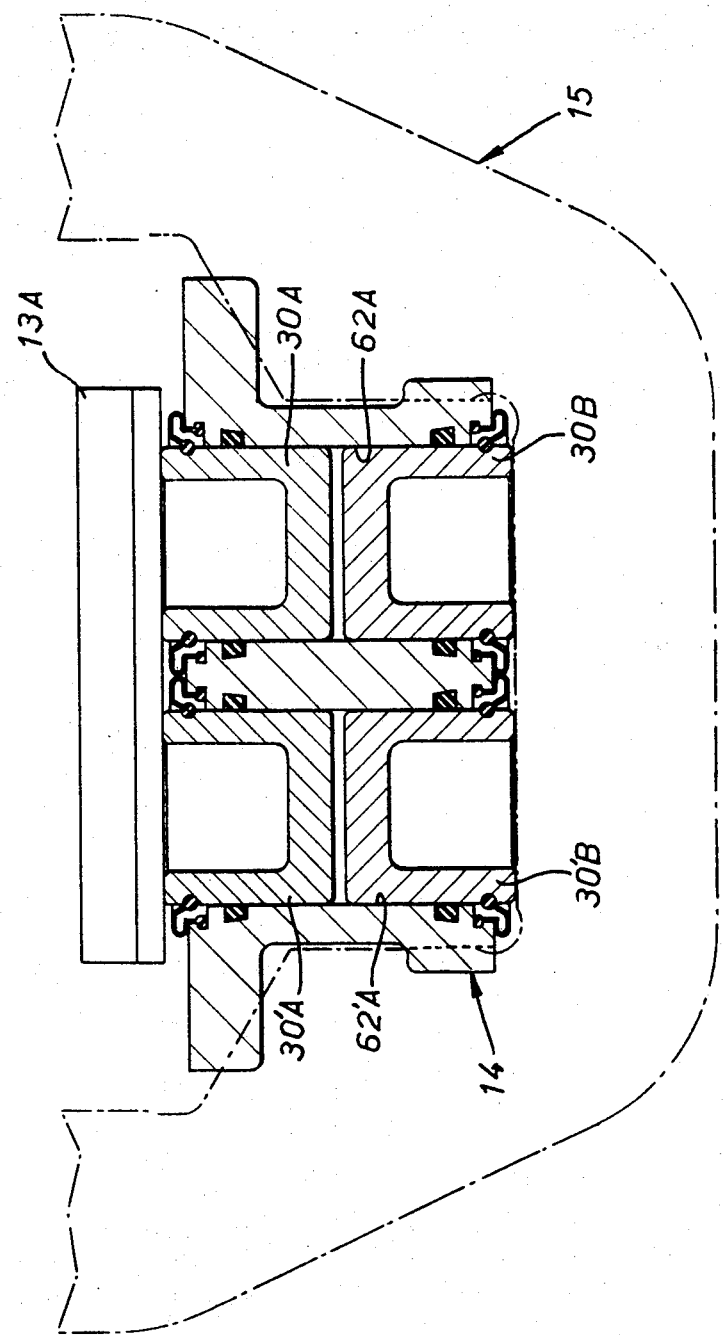

DISC BRAKE WITH PLURAL PISTONS ACTING ON ONE SHOE

BACKGROUND OF THE INVENTION

The present invention relates generally to disc brakes of the type having a disc which rotates with the member to be braked, two brake shoes arranged on either side of this disc, and movable perpendicularly to it, and a cylinder block acting on one of the shoes directly, and on the other through a transfer member, and it concerns more particularly the case where such brakes are intended for motor vehicles.

SUMMARY

A disc brake according to the invention is generally characterised in that at least three pistons are mounted in its cylinder block, these pistons being all arranged on one and the same side of the disc and movable perpendicularly to the latter, two in one first direction, the other in the opposite direction.

According to a preferred method of embodiment, two of these pistons act upon a brake shoe, the other on the transfer member.

It is thus possible to give a greater surface area to the braking shoe upon which these two pistons act, and, consequently, other conditions being equal, to reduce the wear to which such a shoe is subject.

This arrangement is particularly advantageous in the case, for example, of a disc brake intended for a heavy motor vehicle.

In addition, it is particularly suitable for the employment on any vehicle fitted with brakes of this type, of two braking circuits, which are independent, such as are laid down or recommended by the safety regulations in force in certain countries.

BRIEF DESCRIPTION OF THE DRAWINGS

FIGS. 4 and 5 are views similar to FIG. 3 and each relate respectively to an alternative embodiment.

DESCRIPTION OF THE PREFERRED EMBODIMENTS

These Figures show a disc brake of the type comprising generally; a disc 10 secured to the wheel or the member to be braked; a fixed support 11 in the shape of a U, extending on either side of disc 10, and having on either side of the latter two windows 12A, 12B in which braking shoes, respectively 13A, 13B are movably mounted perpendicularly to the disc 10; a cylinder block 14 fixed to the fixed support 11 facing the windows 12A, 12B of the latter, and a transfer member 15.

Figure 1:
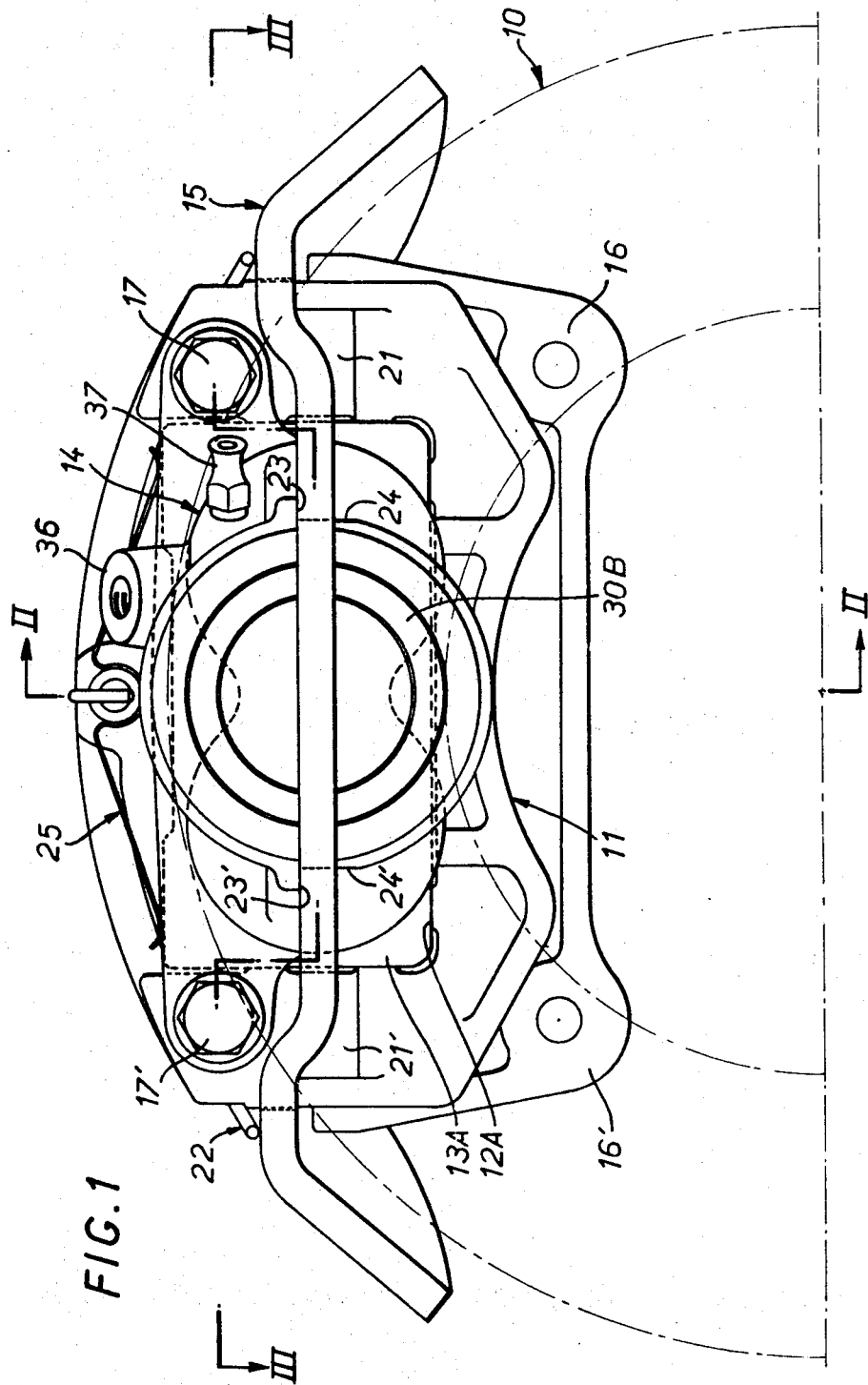
FIG. 1 is an elevation view of a brake according to the invention, in the direction of arrow II of FIG. 2.
Figure 2:
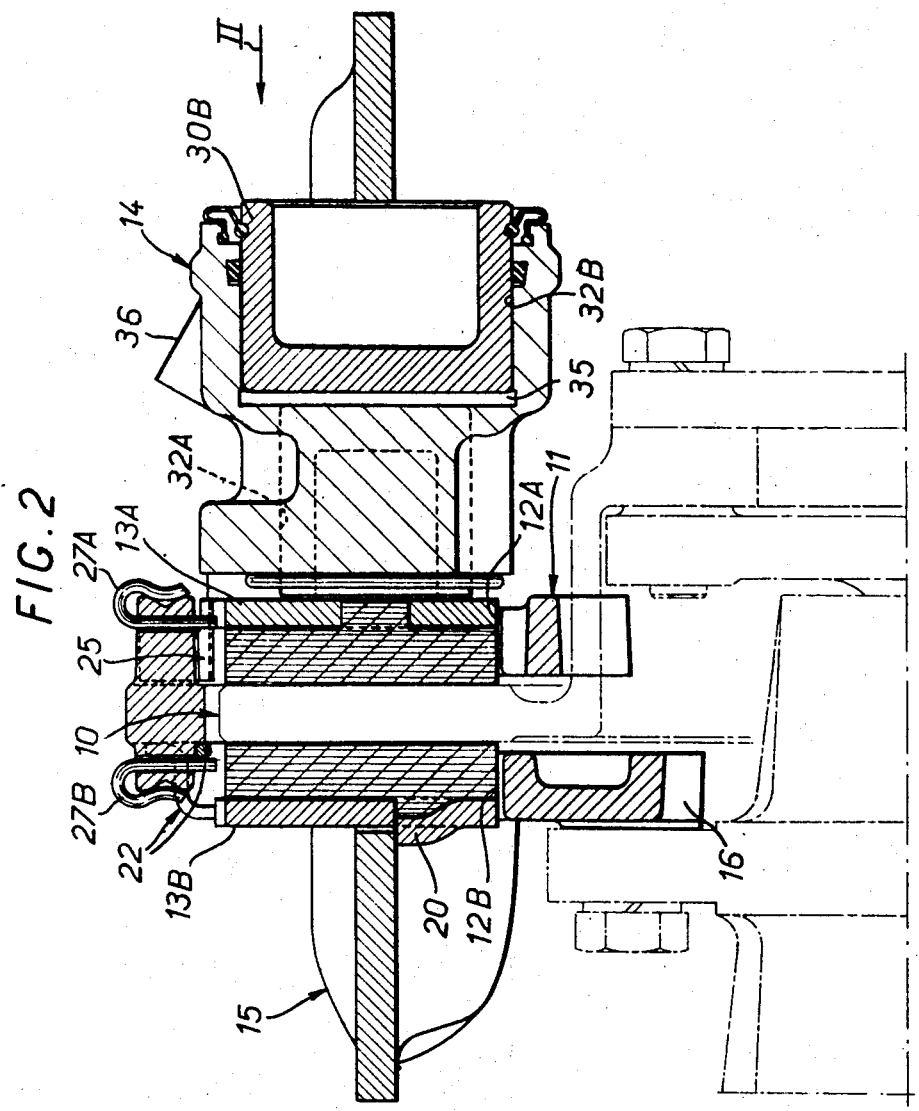
FIG. 2 is a cross-sectional view of this brake according to line II—II of FIG. 1.
Figure 3:
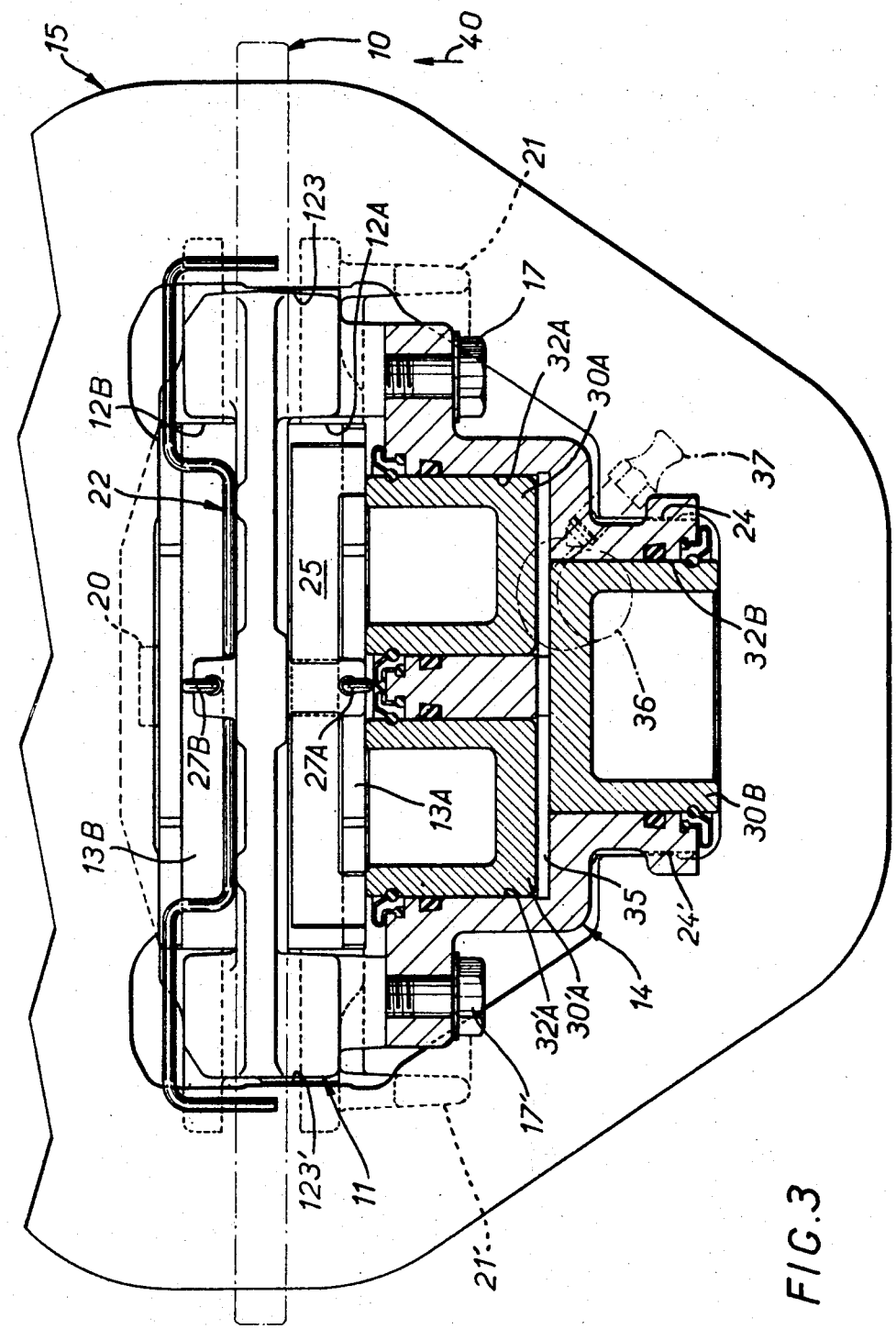
FIG. 3 is a cross-sectional view of this brake along the broken line III—III of FIG. 1.

According to the particular embodiment shown in FIGS. 1 to 3, the support 11, on that side of the disc 10 which is opposite that on which the cylinder block 14 is arranged, has two lugs 16, 16' making it possible to be secured by bolting to any frame, for example to the gear-box casing. The cylinder block 14 is mounted on the fixed support 11 by means of screws 17, 17' perpendicular to the plane of disc 10. The transfer member 15 is a ring, which is substantially flat in its central area and curved towards the disc on its periphery, and it surrounds the fixed support 11, the braking shoes 13A, 13B, the cylinder block 14 and part of the disc 10. This transfer member or ring 15 rests on three support bearings, perpendicular to the plane of the disc 10, one of these bearings being arranged on one side of the disc 10 and being formed by a tongue 20 suitably cut and folded in the support plate of the brake shoe 13B and the other two of these bearings being arranged on the other side of the disc 10, and being constituted by bosses 21, 21' of the fixed support 11. Resilient means, formed in the example represented by a round metal wire 22 suitably formed, is interposed between the support 11 and the transfer ring 15 for the support of the latter upon the three support bearings mentioned above. The ring 15 is guided perpendicularly to the plane of disc 10 by bearings 23, 24 on the one hand, and 23', 24' on the other hand, formed on the cylinder block 14 (FIG. 1) and by bearings 123, 123' formed on the fixed support 11 (FIG. 3). Resilient means, formed in the example shown by a suitably shaped metal blade 25, is interposed between the fixed support 11 and the braking shoe 13A; and pins 27A, 27B ensure that the resilient means 22, 25 mentioned above, is held in position.

In accordance with the invention, at least three pistons 30A, 30'A and 30B slidably mounted in the cylinder block 14, on the same side of disc 10, perpendicularly to the plane of the latter.

In the embodiments represented in FIGS. 1 to 4, the pistons 30A, 30'A act directly upon the braking shoe 13A, while the piston 30B acts upon the transfer member or ring 15.

Pistons 30A, 30'A slide in bores 32A, 32'A hollowed out in the cylinder block 14 parallel to each other, and piston 30B slides in a bore 32B hollowed out in the cylinder block 14 at the end of bores 32A 32'A.

In the embodiment represented in FIGS. 1 to 3 the bore 32B communicates directly with each of the bores 32A, 32'A through a gap 35 common to those three bores; moreover, the axes of the three bores 32A, 32'A and 32B are co-planar and are situated respectively in the mean plane of the transfer member or ring 15, the axes of the bores 32A, 32'A being symmetrical with each other in relation to the axis of bore 32B.

The cylinder block 14 bears a boss 36 in which a passage is hollowed out which open substantially into the gap 35 which is in communication with each of the bores 32A, 32'A and 32'B.

The cylinder block 14 bears also a drain nozzle 37 in communication with this gap 35.

Such a brake operates as follows:

When pressurised fluid is sent to the gap 35 described above, pistons 30A, 30'A move perpendicularly to the plane of disc 10, along arrow 40 of FIG. 3, and thus come to apply the braking shoe 13A against the disc 10.

At the same time, piston 30B moves in the opposite direction, and thus forces the transfer members 15 to move in a direction opposite to that of arrow 40, said transfer member thus causing the application of the shoe 13B against the disc 10.

The disc 10 is then clamped.

When the hydraulic pressure is relaxed, the disc 10 is released.

In the method of embodiment described above, the bores 32A, 32'A, 32B of the cylinder block belong therefore to one and the same braking circuit.

Figure 4:
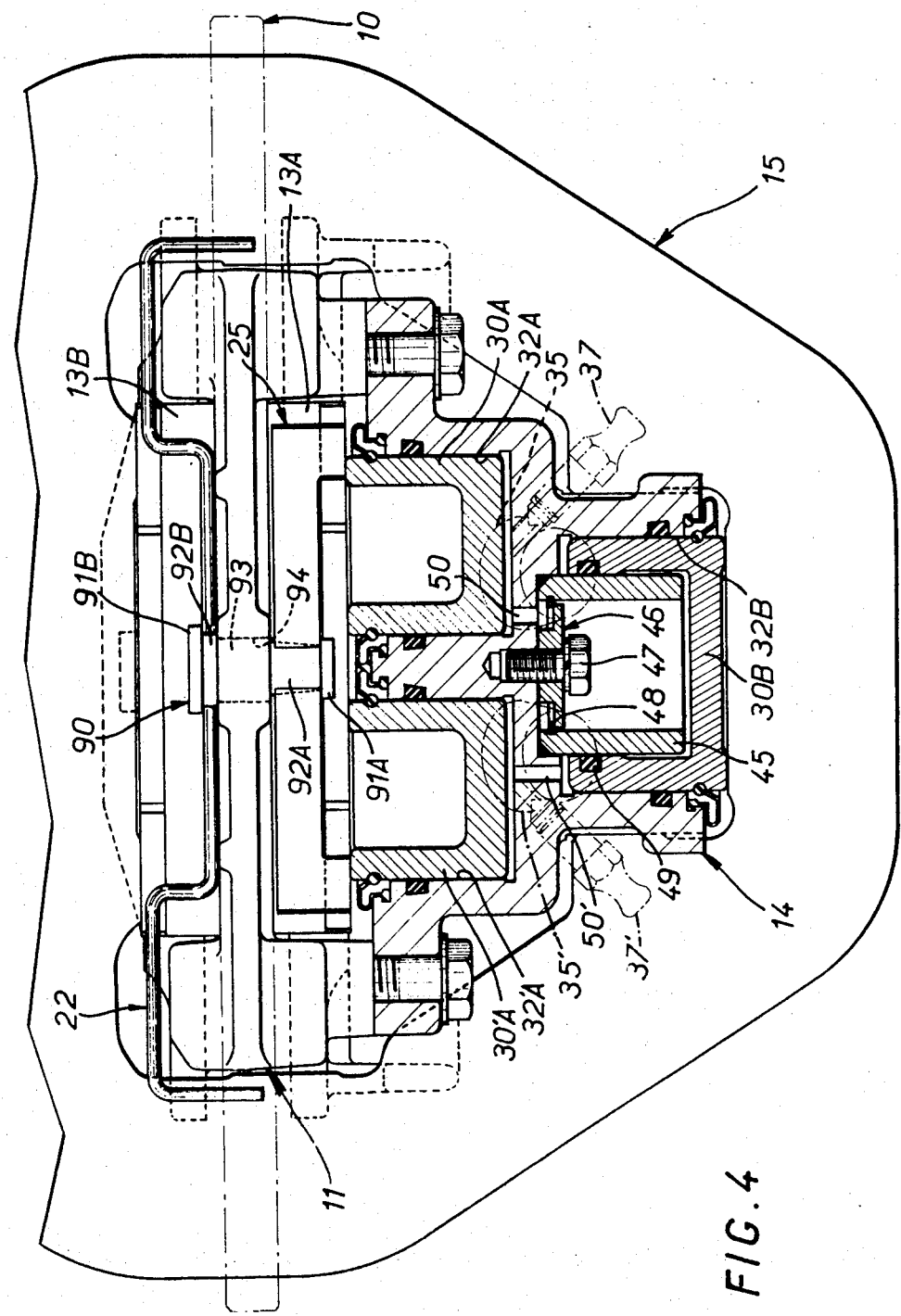

In accordance with the embodiment represented on FIG. 4, these bores belong to two independent braking circuits.

According to that alternative, the piston 30B, which is bell-shaped, has its concave portion facing towards the disc 10 and is engaged so as to slide on the one hand into the bore 32B of the cylinder block 14, as previously, and, on the other hand, on a sleeve 45; the latter is mounted on the cylinder block 14 by means of a plug 46 secured by a screw 47 to the said cylinder block 14 and a circlip 48 engaged in the sleeve 45 and held by the said plug 46.

A sealing ring 49 effectively seals the sliding of the piston 30B on the sleeve 45, while a suitable seal is also provided at the end of the sleeve 45 in contact of the latter with the cylinder block 14.

The bore 32A in which the piston 30A slides communicates with the bore 32B in which piston 30B slides by means of a passage 50 which opens out in the said bore 32B inside the sleeve 45.

Similarly, the bore 32'A in which piston 30'A slides communicates with bore 32B in which piston 30B slides by means of a passage 50' which opens out into the said bore 32B outside the sleeve 45.

With the bore 32A there is associated on the one hand a supply boss 35, and on the other hand a drain nozzle 37, as previously; jointly, with the bore 32'A there is associated on the one hand a supply bore 35' and on the other hand a drain nozzle 37'. The supply bosses 35, 35' and the drain nozzles 37, 37' have been diagrammatically represented in dashed lines on FIG. 4; they open out in the bottom of the corresponding bores 32A, 32'A.

Such a brake operates as follows:

When the two braking circuits are in operation, fluid under pressure is sent simultaneously into the bores 32A, 32B, the effect of which is, on the one hand, to push the pistons 30A, 30'A in the direction of disc 10 and therefore to apply the braking shoe 13A against the latter, as previously, and, on the other hand, to push the piston 30B in the direction of the transfer member or ring 15 and thus to give rise to the application of the braking shoe 13B against disc 10, as previously.

The disc 10 is then clamped.

It should be noted that in such a case the hydraulic pressure exerts its action on the one hand on the bottom of piston 30B, by virtue of the fluid under pressure coming from the bore 32A, and on the other hand on the side of this piston 30B, by virtue of the fluid under pressure coming from bore 32'A.

When the hydraulic pressure is released, the disc 10 is unclamped.

If any one of the two braking circuits should fail, that is to say if bores 32A, for example, is no longer supplied with pressurised fluid during an application of the brakes, the clamping of the disc may be ensured by the action of the pistons 30'A and 30B alone, which remain controlled by the other of the braking circuits.

It will be noted, moreover, that in the embodiment represented in FIG. 4, the holding of the springs 22, 25 is ensured by a single gudgeon-pin 90 comprising in turn a head 91B ensuring the holding of the spring 22, a cylindrical portion 92B on which this spring 22 is engaged, a cylindrical portion 93 forcibly engaged in a passage 94 of the fixed support 11, a portion 92A on which the spring 25 is engaged, and a head 91A which ensures the holding of the spring 25 and the diameter of which is less than that of the passage 94 to permit positioning of this gudgeon-pin in said passage; as shown, the portion 92A is conical, which enables spring 25 to act upon the shoe 13A with a slight return component directed towards the pistons 30A, 30'A.

FIG. 5 relates to an alternative embodiment which is represented only diagrammatically and partially, and according to which four pistons 30A, 30'A 30B, 30'B are slidably mounted in the cylinder block 14, perpendicular to the plane of the braking disc (not shown).

The cylinder block 14 is for the purpose formed with two parallel bores 62A, 62'A which each open out freely at both their ends.

Pistons 30A, 30B are slidably mounted in bore 62A in opposite directions; the first acts directly upon the braking shoe 13A, and the second acts upon the transfer member or ring 15.

Along parallel axes, pistons 30'A, 30'B are slidably mounted in bore 62'A in opposite directions; the former acts directly upon the braking shoe 13A, in similar manner to piston 30A, and the second acts upon the transfer member or ring 15, in manner similar to that of piston 30B.

These bores 62A, 62'A may belong to one and the same braking circuit, or, as an alternative, to two independent braking circuits, the operation of the brake being in each case similar to that described above.

Naturally, the present invention is not limited to the forms of embodiment described and represented, but it comprises both any alternative execution and/or combination of their various elements, and any alternative combination of these elements with those of the methods of embodiment already known.

I claim:

1. A disc brake having a fixed support, a disc arranged to rotate with the mmeber to be braked, two brake shoes arranged on either side of this disc and movable perpendicularly to it, a cylinder block fixed to said fixed support, and a transfer member, said cylinder block having at least three pistons associated with two independent braking circuits and movably mounted therein perpendicularly to the disc, all of said pistons being disposed on one side of said disc, two of said pistons acting directly on one of said brake shoes and a third said piston acting indirectly upon the other of said brake shoes through said transfer member, the cylinder block comprising two first parallel bores for said two pistons, and a third bore for said third piston, at the end of the first two, said third piston also sliding on a sleeve retained against axial movement in said third bore, and the first two bores both communicating with the third, one inside the said sleeve, and the other outside the said sleeve.

2. A disc brake according to claim 1, in which the axes of all the pistons are coplanar.

3. A disc brake according to claim 1, in which the transfer member is a substantially flat ring which surrounds the cylinder drive block, the brake shoes, and a portion of the disc, the plane of the ring being perpendicular to the disc, and the axes of the pistons being coplanar and situated in the mean plane of said ring.

4. A disc brake according to claim 1, in which said two pistons are disposed side by side and have spaced parallel axes.

* * * * *